United States Patent
Zhang et al.

(10) Patent No.: US 8,738,583 B2
(45) Date of Patent: May 27, 2014

(54) EFFICIENTLY DELIVERING EVENT MESSAGES USING COMPILED INDEXING AND PAGINATED REPORTING

(75) Inventors: Roulei Zhang, San Jose, CA (US); Sohag Desai, Fremont, CA (US); Hemant Patel, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 117 days.

(21) Appl. No.: 13/024,218

(22) Filed: Feb. 9, 2011

(65) Prior Publication Data

US 2012/0203794 A1    Aug. 9, 2012

(51) Int. Cl.
  *G06F 7/00*    (2006.01)
(52) U.S. Cl.
  USPC ........... 707/661; 707/795; 707/812; 709/208; 709/209; 709/225; 709/238
(58) Field of Classification Search
  None
  See application file for complete search history.

(56) References Cited

U.S. PATENT DOCUMENTS

| | | | | |
|---|---|---|---|---|
| 5,758,150 A | * | 5/1998 | Bell et al. | 1/1 |
| 6,249,791 B1 | * | 6/2001 | Osborn et al. | 1/1 |
| 6,643,644 B1 | * | 11/2003 | Furusho | 1/1 |
| 7,424,519 B2 | * | 9/2008 | Hoshino et al. | 709/212 |
| 7,536,576 B2 | * | 5/2009 | Shima et al. | 713/340 |
| 7,882,262 B2 | * | 2/2011 | Bhattacharya et al. | 709/238 |
| 2004/0199552 A1 | * | 10/2004 | Ward et al. | 707/204 |
| 2004/0260694 A1 | * | 12/2004 | Chaudhuri et al. | 707/5 |
| 2008/0115086 A1 | * | 5/2008 | Rupp et al. | 715/810 |
| 2009/0300001 A1 | * | 12/2009 | Mihara | 707/5 |
| 2010/0094997 A1 | * | 4/2010 | Chou | 709/224 |
| 2010/0259380 A1 | * | 10/2010 | Ohtani et al. | 340/540 |

* cited by examiner

*Primary Examiner* — Fred I Ehichioya
*Assistant Examiner* — Hasanul Mobin
(74) *Attorney, Agent, or Firm* — Hickman Palermo Truong Becker Bingham Wong LLP

(57) ABSTRACT

Techniques for compiled indexing and paginated reporting are described. Event messages, having sequential identifiers, are received and stored in a working table. The working table is renamed as a rollover table upon receiving a threshold number of the event messages and a new working table is created. A reference to the rollover table is stored in a management table. Summary data which summarizes each rollover table according to predetermined criteria is stored in a summary table with the reference to the corresponding rollover table. When a query to the event messages is received, a response to the query is generated based on the contents of the summary table and management table. The response may also include a predetermined quantity of event messages based on a dimension of a window of a graphical user interface of a client computer which issued the query.

20 Claims, 6 Drawing Sheets

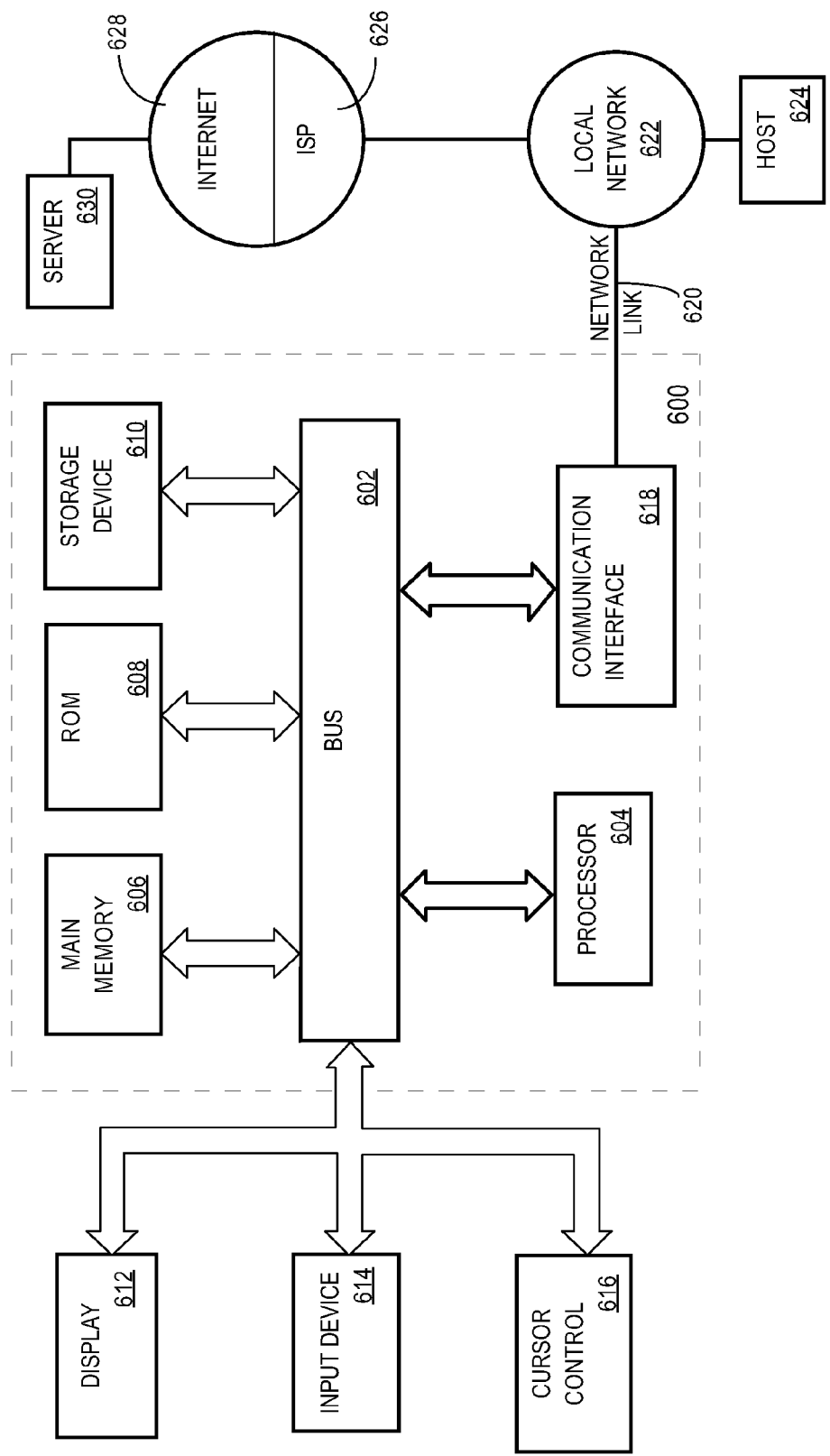

EFFICIENTLY DELIVERING EVENT MESSAGES USING COMPILED INDEXING AND PAGINATED REPORTING

TECHNICAL FIELD

The present disclosure relates generally to data processing in computer networks, and more specifically, to techniques for efficiently delivering event messages from large databases.

BACKGROUND

Computer networks typically include a service for logging event messages that are propagated through the network. Logging event messages may be useful for a variety of reasons including computer system management, network security analysis, and debugging. Syslog, detailed in Request For Comments (RFC) 3164, is one example of a data logging service which provides a standard for logging event messages in an IP network. Network devices, such as routers, workstations, and servers, within the computer network are examples of network nodes capable of logging and forwarding event messages ("syslog messages"). Generally, syslog messages are not stored by applications running on the devices within the network. Instead, these messages are sent to a dedicated server that saves the received messages into a log file or database. In most cases, acknowledgement or receipt of the message is not required or even desired.

When an event is generated by a device within the network, the device will send a small textual message to a syslog server. The syslog messages generally consist of identifiers for the facility that generated the message, message severity level, and timestamp indicating the time at which the event occurred. After receiving a message, the syslog server will store the message in a database.

As networks grow and become increasingly complex, the volume of structured events, such as syslog messages sent through the network, also increases. For large networks, it is not uncommon for a syslog database to store thousands of records per second continuously for weeks and months at a time. In many instances, these databases contain billions of records. Efficiently accessing, interpreting, and reporting against the data becomes a problem for databases of such enormity, as query performance tends to deteriorate as database table size increases.

For example, depending on the database vendor, insert and query operations show evident slowdown when a table holds 60 MB, or roughly 400,000 records on average. However, when a database contains millions or billions of records, data operations may take days to return.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 6 illustrates a computer system with which an embodiment may be carried out.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In one embodiment, an event processing computer receives a plurality of event messages over a network. The event messages are initially stored in a working table. Upon receiving a threshold number of event messages, the working table is renamed as a rollover table, and a new working table is created to store subsequent event messages received by the event processing computer. As subsequent event messages are received, additional working tables and rollover tables are created in the same manner.

For each rollover table that has been created, a reference, identifying a range of event messages in a rollover table, is stored in a management table. Data that summarizes the event messages in each rollover table is stored in a summary table with a reference to the corresponding rollover table.

The event processing computer receives a query from a client computer which identifies a subset of the event messages stored in any of the rollover tables. In an embodiment, event processing computer generates a response to the query based on the information stored in the management table and summary table. In other embodiments, a predetermined quantity of event messages, stored in the rollover tables, are included in the response to the client. The predetermined quantity may be based on a dimension of a window of a graphical user interface of the client computer.

An embodiment for efficiently responding to queries to large datasets of event messages generally comprises dividing up received event messages into threshold-sized R-tables and storing, in M and S-tables, information which summarizes each R-table according to predetermined criteria. When a query is received, a response is generated based, at least in part, on summarized data of the M-Table and S-Table which is relevant to the query. Generating a response based on pre-compiled summary data greatly decreases response time in comparison with iterating through an entire database at query time. In an embodiment, a predetermined quantity of the relevant data is returned in the response. The predetermined quantity may be based on a dimension of a window of a graphical user interface of the client computer.

Example Network Context

Figure 1:
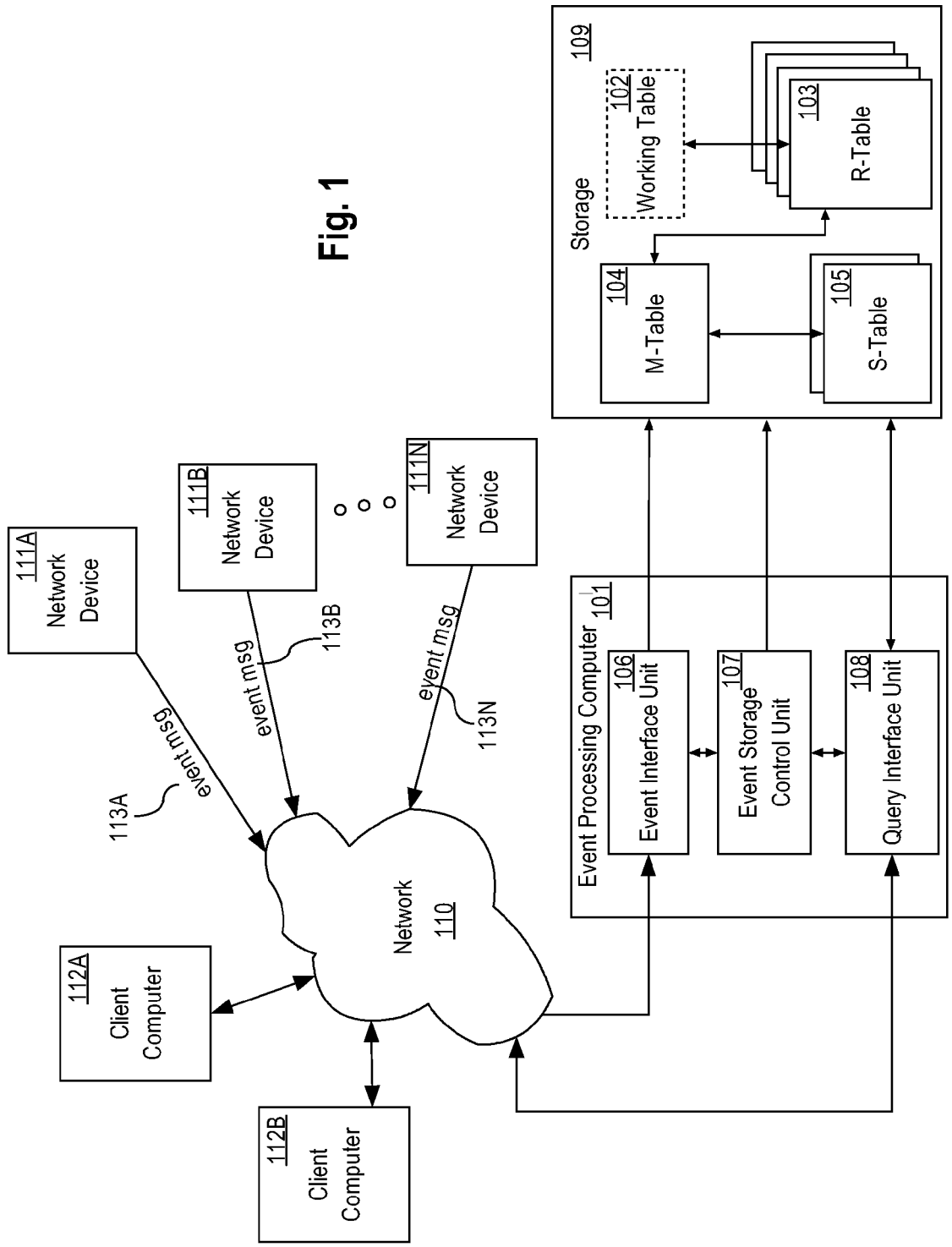
FIG. 1 illustrates a network including an event processing computer.

FIG. 1 illustrates an embodiment in a network context. Generally, FIG. 1 comprises network devices 111A, 111B, 111N, network 110, event processing computer 101, storage 109, and client computers 112A, 112B.

Multiple network devices 111A, 111B, 111N are coupled through at least one network 110 to event processing computer 101. For purposes of illustrating a clear example, FIG. 1 depicts three network devices; however, in a practical embodiment thousands or millions of network devices may be coupled to event processing computer 101. In one embodiment, network devices are routers, switches, gateways, cable modems, DSL modems, or other networking nodes or adapters.

Network 110 represents any combination of one or more local networks, wide area networks, internetworks or service provider networks. Network 110 may represent a public internetwork such as the Internet or private networks. In some embodiments, network 110 may be omitted and a network device 111A may have a direct connection to the event processing computer.

Network devices 111A, 111B, 111N communicate event messages 113A, 113B, 113N to event processing computer 101 over network 110. In an example embodiment, event messages 113A, 113B, 113N are Syslog messages according to RFC 3164. In other embodiments, event messages are any structured event data, such as Simple Network Management Protocol (SNMP) Traps, NetFlow, JFlow, NetStream, and/or CFlow messages.

Event Processing Computer

Event processing computer 101 may be a server computer, such as any LINUX, Windows or UNIX workstation or similar platform. Thus, event processing computer 101 includes or has access to conventional circuitry for transmitting and receiving messages over network 110. Event processing computer 101 is configured to store a plurality of event messages received over network 110 and receive and respond to queries from client computers 112A, 112B. In an embodiment, event processing computer 101 stores received event messages in a storage device 109. In various embodiments, storage device 109 is a one or more remote repositories or local mass storage devices.

In one embodiment, the event processing computer 101 facilitates efficient access to stored event messages by maintaining specified database tables. A plurality of rollover tables (R-tables) 103 are used to store event messages as further described herein. Management table 104 and summary tables 105 are used to manage and summarize, respectively, the plurality of R-tables 103 as further described herein. The event processing computer 101 also comprises logic units 106, 107, 108 to handle incoming event messages 113A, 113B, 113N and queries against stored event messages.

Event interface unit 106 of event processing computer 101 processes incoming event messages 113A, 113B, 113N. In an embodiment, the event interface unit 106 provides the interface through which the event processing computer 101 receives event messages 113A, 113B, 113N from network 110.

In an embodiment, event storage control unit 107 provides the logic necessary to process incoming event messages, respond to queries, and dynamically generate R-Tables, M-Tables, and S-Tables according to the embodiments described herein. In other embodiments, such logic may be distributed throughout other logic units within the event processing computer 101 or one or more remote computers.

Query interface unit 108 receives queries from one or more client computers 112A, 112B. In an embodiment, the query interface unit 108 forwards a received query storage unit 109. After running the query terms on the stored event messages, query interface unit 108 receives a response to the query from the storage unit 109. The response is sent to the requesting client computer 112A over network 110.

Table Initialization and Population

Figure 4:
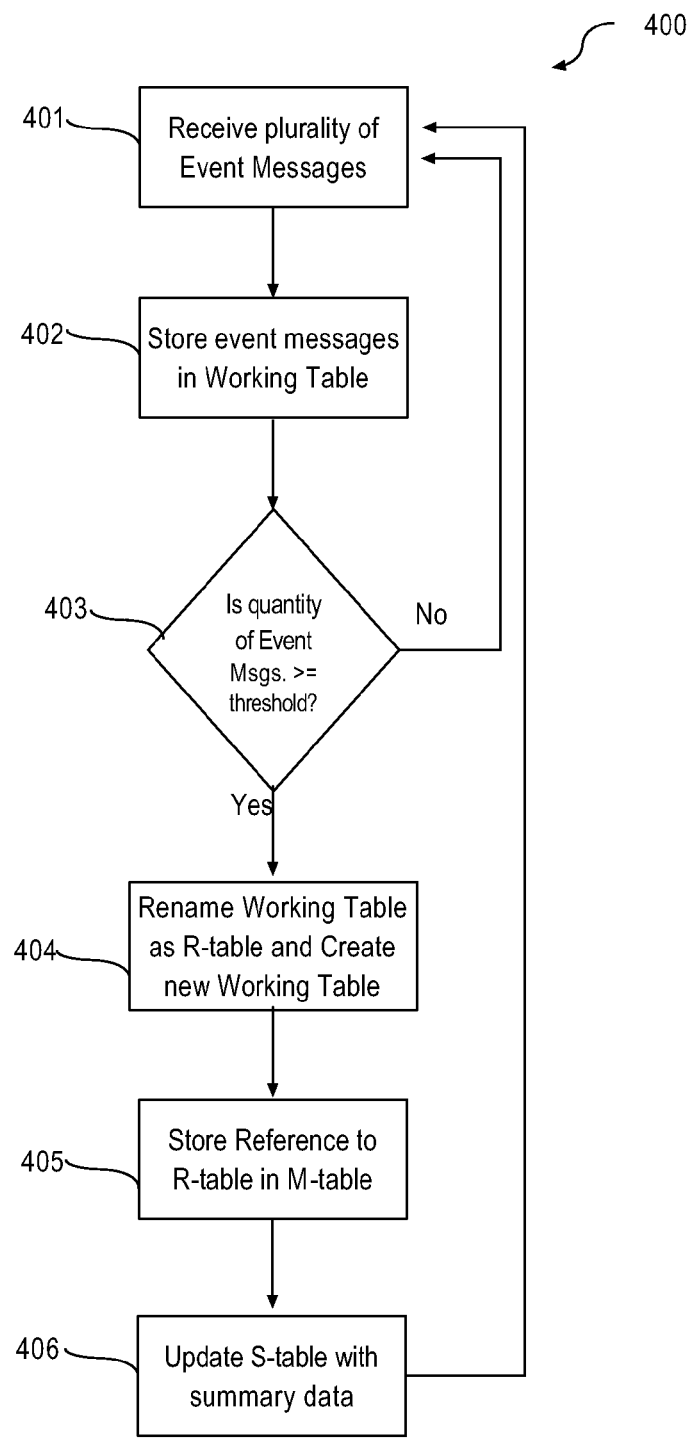
FIG. 4 illustrates table initialization and population by an event processing computer.

For event processing computer 101 to efficiently respond to a query, multiple database tables 103, 102, 104, 105, are created or generated to store and summarize event messages 113A, 113B, 113N. Initially, three tables are generated: a working table 102, a management table (M-table) 104, and a summary table (S-table) 105. FIG. 4 is a flow diagram of logic steps 400 taken by event storage control unit 107 to generate and update these tables as event messages are received by event processing computer 101 through event interface unit 106, in an embodiment.

Receiving Event Messages

In step 401, event messages 113A, 113B, 113N are received by event interface unit 106. Received messages are then inserted into working table 102 in step 402. Working table 102 may be a temporary storage location for received event messages. In an embodiment, event storage control unit 107 contains logic that manages tables, namely R-Table 103, M-Table 104, and S-Table 105. For example, event storage control unit 107 may insert received event messages 113A, 113B, 113N into working table 102. Event storage control unit 107 also monitors, or retains a reference to, the quantity of event messages that has been forwarded to working table 102.

Determining a Threshold Quantity

In step 403, event storage control unit 107 determines whether the quantity of event messages received is greater than or equal to a specified number or a threshold number of event messages. The threshold quantity may be specified in configuration data. In an embodiment, the threshold quantity of event messages is empirically determined by monitoring query performance as queries are iteratively issued on R-tables of increasing size. In an embodiment, query performance is a metric based on a length of time event processing computer 101 takes to generate a response to a query. Thus, performance increases as response time decreases, and conversely, performance decreases as response time increases.

An optimum threshold quantity may be the maximum quantity realized at a specified performance (that is, the maximum quantity realized before query or insert performance begins to drop to an unacceptable level). For example, if the maximum acceptable query response time for a client computer 112A is 10 seconds, empirically determining an optimum threshold quantity may include iteratively issuing test queries on R-tables of increasing size, and identifying a quantity at which query or insert response time is greater than 10 seconds.

Generating R-Tables

In step 404, upon determining that the working table 102 contains at least a threshold quantity of event messages, event storage control unit 107 generates a new rollover table (R-table) 103 that contains at least the threshold quantity of event messages. Step 404 is also referred to herein as a "rollover action" as it signifies the point at which at least the threshold quantity of received event messages are "rolled over" into an R-table. In an embodiment, event storage control unit 107 generates or rolls-over a new R-table 103 by re-naming working table 102, and then creating a new working table to receive a subsequent threshold quantity of event messages. After the first threshold number of event messages is received and rolled-over, there is only a single instance of R-table 103, and receiving multiples of the threshold number of event messages results in creating and rolling over to multiple instances of R-tables.

By way of example, once event storage control unit 107 determines that the working table 102 contains 300,000 (i.e., at least a threshold quantity) of received event messages, working table 102 is blocked from receiving subsequent event messages and re-named to generate R-table 103. A new working table is then populated by subsequently received event messages. Additional rollover tables are created as new working tables filled to contain 300,000 messages.

To generate or roll over a new R-table 103, event storage control unit 107 contains logic which re-names working table 102 according to the received event messages contained therein. In an embodiment, the name of the newly generated R-table 103 encodes the timestamp range of the event messages contained in R-Table 103. For example, considering an R-table containing syslog messages, a timestamp encoded name of the R-table identifies the range of timestamps included in the R-table (such as a name that encodes the first and last timestamped messages in the R-table).

Figure 2:
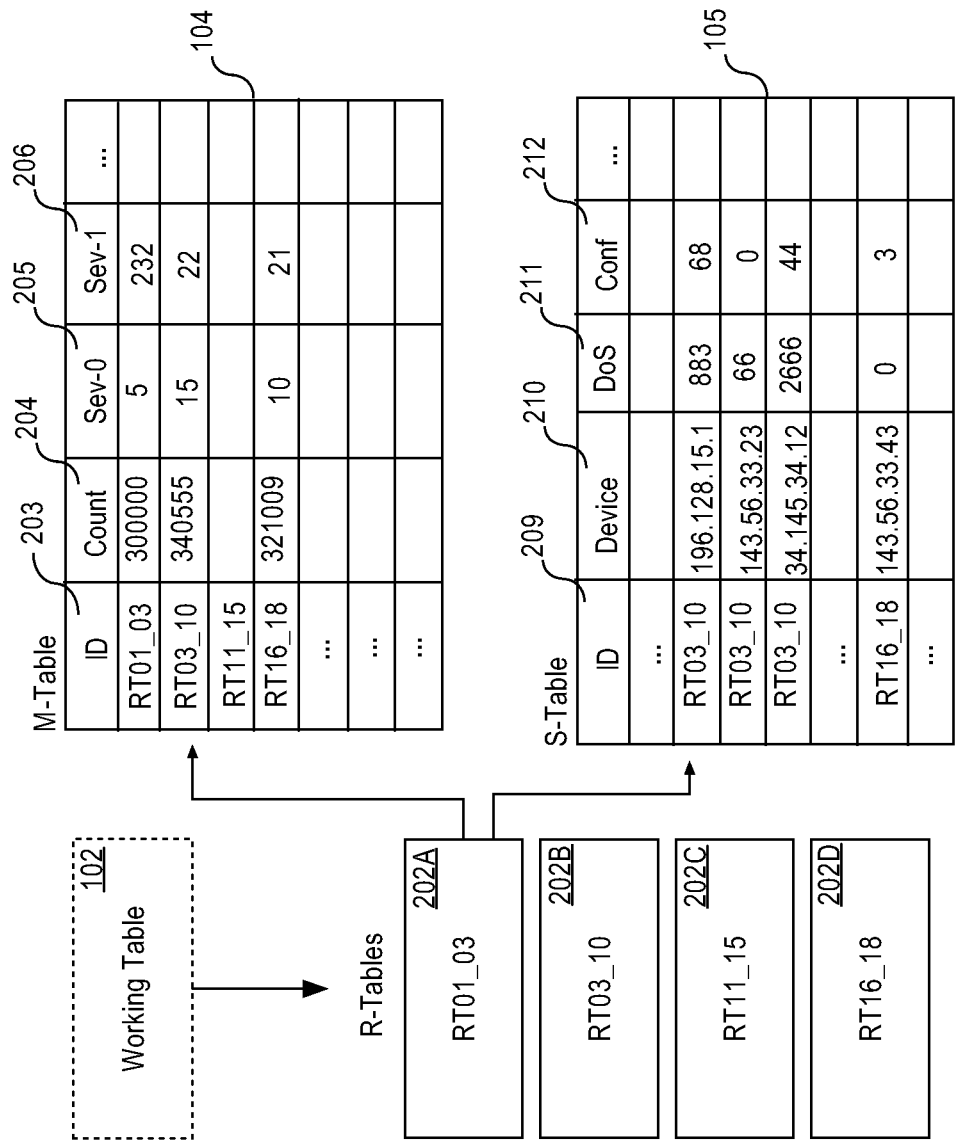
FIG. 2 illustrates tables generated by an event processing computer.

FIG. 2 illustrates four example R-tables 202A, 202B, 202C, 202D that could be generated by event processing computer 101 in an embodiment. Each R-table 202A, 202B, 202C, 202D may be named according to event messages contained within each table (event messages not shown). For example, R-table 202A may be named "RT01_03," indicating that R-table 202A contains a threshold number of event messages spanning the range of time "01" to "03." R-tables 202B, 202C, 202D may be named in the same manner. In other embodiments, R-tables 202A, 202B, 202C, 202D may be named according to other naming schemes. For example, an R-table name may only include the time of the first timestamped message, thereby relying on the next table to indicate the actual time range of the messages.

When event interface unit 106 receives event messages at a high rate, the event interface unit 106 may receive event messages during rollover action in step 404 at the time working table 102 is blocked and re-named, and a new working table is created. Thus, in an embodiment, event storage control unit 107 contains logic which allows event messages received during step 404 to be temporarily stored and then later inserted in the new working table, once created.

Updating M-Table

In step 405, after R-table 103 is generated, event storage and control unit 107 stores a reference, or key, to R-table 103 in M-table 104. This configuration aids in summarizing or, "keeping track" of, the R-tables as they are generated. In an embodiment, M-table 104 provides a row for each R-table name that has been created. Since the name of R-table 103 encodes a range of timestamped event messages, each row of M-table 104 identifies the range of timestamps associated with a particular R-table. Referring again to the example embodiment of FIG. 2, M-table 104 contains rows 207. Each row 207 contains an identifier (ID) column 203 for storing a reference to an R-table.

In an embodiment, each row of the M-table 104 also contains one or more values that represent a total number of a particular type of event message contained in the corresponding R-table. FIG. 2 depicts M-table 104 with columns 204, 205, 206, where each column 204, 205, 206 is related to information identified by syslog messages, such as count and severity. Columns 204, 204, 206 indicate additional information summarized from each corresponding R-table 202A, 202B, 202C, 202D.

For example, considering the reference to R-table 202A in M-table 104, column 205 contains a value for the number of event messages stored in R-table 202A which are associated with a severity level of "0" (Sev-0). In this case, five event messages within R-table 202A are associated with a severity level of "0." Likewise, column 206 indicates that R-table 202A also contains 232 event messages associated with a severity level of "1."

The information identified by columns 204, 205, 206 may vary depending on the type and structure of event messages stored within R-tables 103. Further, M-table 104 may include any number of columns. Thus, the particular columns of M-table 104 in FIG. 2 may be omitted in other embodiments including different types of structured event messages.

Updating S-Tables

Again referring to FIG. 4, upon completion of a rollover action, event storage control unit 107 also modifies existing S-table 105 in step 406. In an embodiment, when R-table 103 is generated, a row is added to S-table 105 for each resource that contributed event messages 113A, 113B, 113N to R-table 103. In the context of syslog messages, a resource is a network device 111A that contributed a syslog 113A to R-table 103. Thus, upon completion of the rollover action, S-table 105 is updated with at least three rows, one for each network device 111A, 111B, 111N. FIG. 2 depicts S-table 105 with a device identifier column 210. In this case each device contributing syslogs to R-tables 202A, 202B, 202C, 202D is identified by a unique IP address associated with the device. Other embodiments may include different device identifiers, such as a brand or model number of a network device.

In an embodiment, event storage control unit 107 automatically updates predefined report columns 211, 212 of S-table 105 to reflect the event messages in the newly rolled-over R-table 103. A predefined report column further summarizes event messages included in the R-tables 103 and may be based on a group of columns of S-table 105 and/or M-table 104. FIG. 2 depicts a Denial of Service (DoS) report column 211 and a configuration (Conf) report column 212. The columns 211, 212 of the drawing figure represent example information that is gathered and summarized based on the contents of a corresponding R-table, and/or contents of the M-table. As an example, after a rollover action, S-table 105 is automatically updated to increment a value stored in DoS column 211. Updating the DoS column 211 may comprise a determination by event storage control unit 107 that a certain number of temporally similar syslogs, contained in R-table 103 or a range of R-tables, have a heightened severity level.

The information identified by columns 210, 211, 212 may vary depending on the type and structure of event messages stored within the R-tables. Further, S-table 104 may include any number of columns depending on the type information reported. Thus, the particular columns of S-table 105 in FIG. 2 may not be relevant to other embodiments including different types of structured event messages.

In another embodiment, one or more columns of S-table 105 are automatically updated with information that is anticipated to be requested in a future query to one or more R-tables 103. When it is known, in advance to receiving a query, that a particular type of information is likely to be requested in a query, S-table 105 is automatically updated to contain pre-compiled columns (or reports) containing such information.

Thus, upon completion of a rollover action, event storage control unit 107 may automatically update S-table 105 to store anticipated information.

For example, assume that it is known that a DoS condition can be deduced from a set of syslogs, and it is likely that a client computer 112A will request a DoS report. In this situation it is useful to configure event storage control unit 107 to automatically pre-compile the anticipated DoS report and store the report in column 211 of S-table 105.

In another embodiment, anticipated information is based on one or more previous queries issued by client computers 112A, 112B. For example, as a query is received by query interface unit 108, event storage control unit 107 compares information requested in query from client computers 112A to the existing columns of S-table 105. If the information requested is not already contained in S-table 105, logic of event storage control unit 107 adds one or more columns to S-table 105 to reflect the new query. Thus, for future queries of the same type, S-table 105 will contain pre-compiled information which can be used to generate a response to a requesting client computer 112A.

Upon completion of the initialization and population of an R-table 103, control is passed back to step 401 to process subsequent event messages.

Query Handling

Query interface unit 108 handles I/O processing associated with receiving and responding to queries. Referring again to FIG. 1, a query may originate from a client computer 112A over network 110. In other embodiments, a query may originate from a terminal directly coupled to event processing computer 101. Query interface unit 108 may be configured to accept queries only after table initialization operations (as described above) are complete. Thus event storage control unit 101 may send a signal to query interface unit 108 to indicate that queries may be processed after table initialization and at least one R-table is populated.

Figure 5:
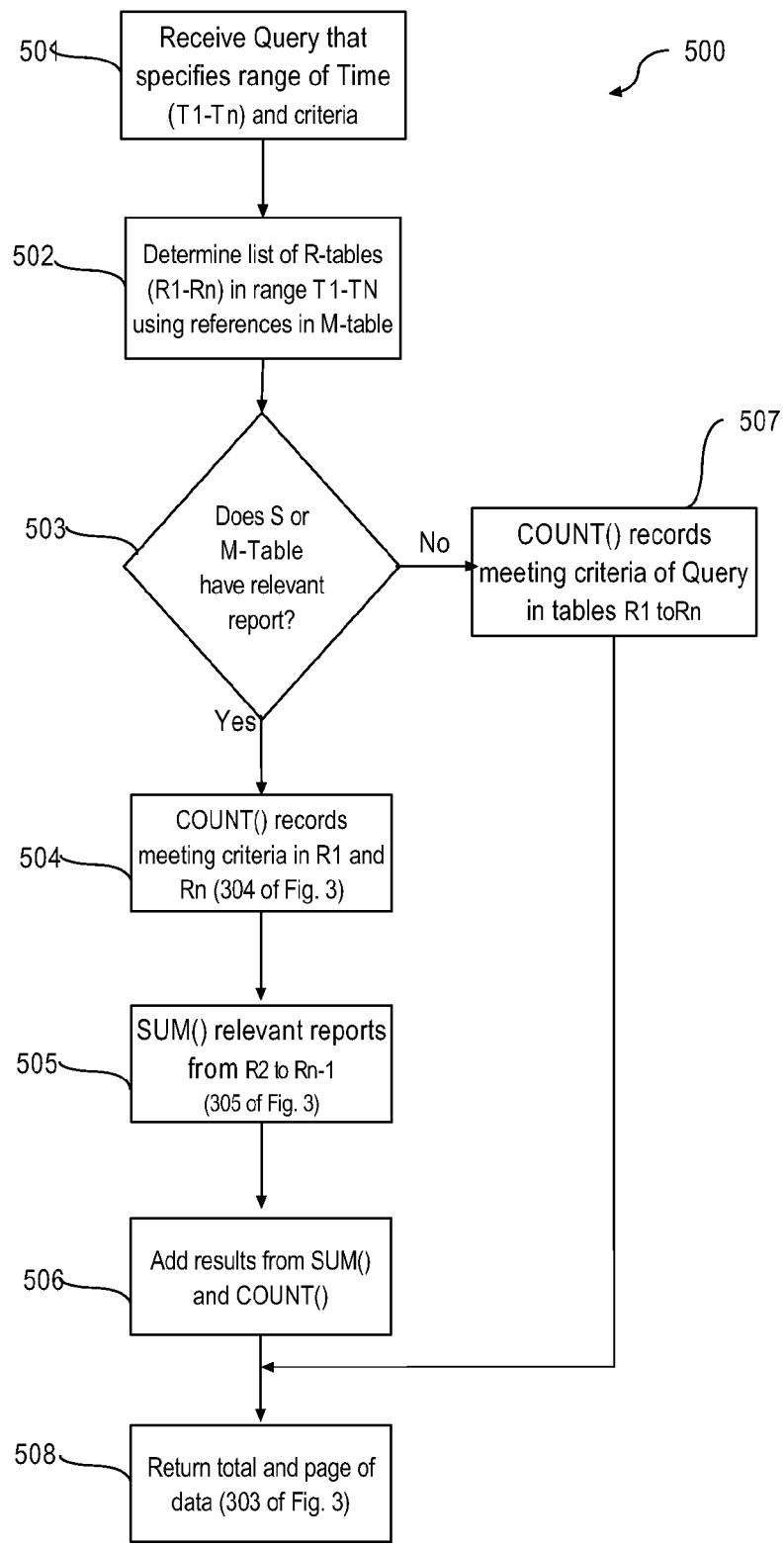
FIG. 5 illustrates an approach to generate a response to a query.

FIG. 5 illustrates processing queries. In step 501, a query is received at event interface unit 108. In this context, a query includes two components: (1) a request for information that summarizes a particular set of event messages according to specified criteria; and (2) a range of time (T1-Tn).

For example, client computer 112A may request a count of the number of event messages occurring during Nov. 10, 2010 (T1) to Nov. 14, 2010 (Tn) which indicate a DoS attack. Further, the request may require a response that returns the actual set of event messages meeting the specified criteria such that a user can inspect individual event messages.

In step 502, the first step in generating a response to the query received in step 501 includes determining a list of R-tables (R1-Rn) that include event messages in the range specified in the query. As discussed above, M-table 104 contains references to each R-table and the range of timestamped event messages included in each R-table. Therefore, step 502 can be accomplished by iterating through rows of M-table 104 to identify R-tables associated with the start and end of the range of time specified in the query.

In step 503, a determination is made as to whether the S-table contains a report or column of information relevant to the query criteria. If the S-table does not contain any summary information pertaining to the query criteria control is passed to step 507. In step 507, event storage control unit 107 iterates through the list of R-tables (R1-Rn) returned in step 502 to determine whether each event message within the range of time T1-Tn meets the query criteria. Due to the lack of data stored in S-Table, this operation may be costly, as each event message in the list of R-tables R1-Rn from time T1-Tn must be accessed and compared to the query criteria.

Control is passed to step 504 if S-table 105 contains summary information relevant to the query criteria. Although relevant summary information exits for R1, the query specifies a start time T1, within R-table R1, which makes the summary data stored in S-table 105 irrelevant with respect to R-table R1. Therefore, the COUNT query is needed to determine the number of relevant event messages from time T1 to the end of R1. This span of event messages is defined by segment 301 in FIG. 3. The same logic applies to relevant event messages in segment 302, as the end time Tn specified in the query ends within R-table Rn.

Thus, in step 504, a COUNT query is issued on both the first and last R-tables (R1 and Rn, respectively) returned in step 502. In an embodiment, the COUNT query is an SQL query which returns a number of rows in a table that meet a specified predicate.

Figure 3:
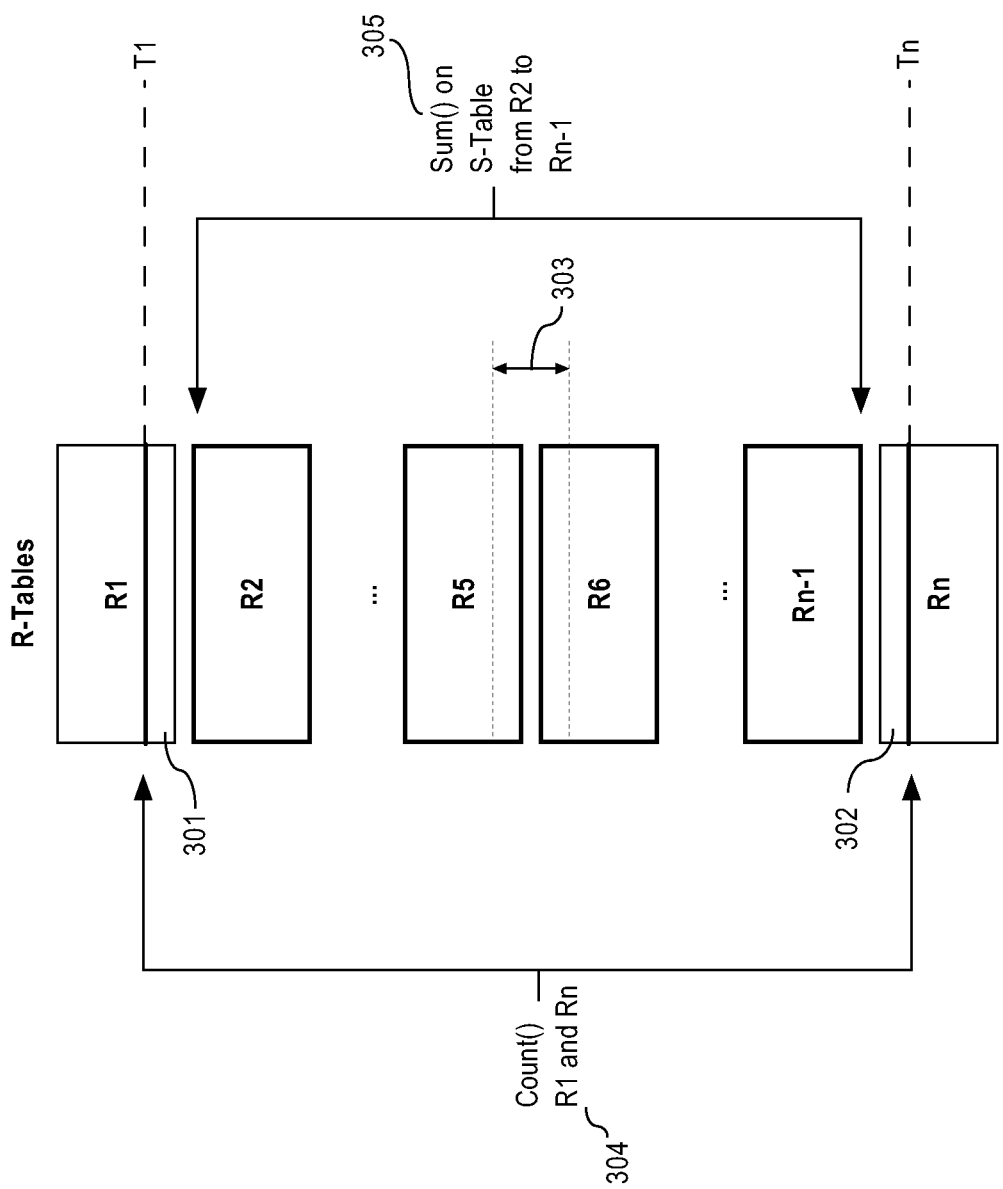
FIG. 3 illustrates rollover tables used by an event processing computer.

In step 505, a SUM query is issued on S-table 105 to gather the summary information relevant to the query criteria. As depicted in FIG. 3, the SUM query (305) is only issued from R2 to Rn−1 because the relevant event messages from R1 and Rn are have already been counted in step 504. This step produces significant time savings over iterating through each event message (as described above in step 507), as the processing related to applying the query criteria to each event message has already been completed and the results stored and summarized in S-table 105. In an embodiment, the SUM query is an SQL query which returns a sum of the data in a specified column of a particular table or tables.

In step 506, the total number of event messages meeting the criteria specified in the query is calculated by adding the COUNT values (304) found in step 504 to the SUM value (305) found in step 505.

In step 508, the total number of event messages meeting the criteria specified in the query is returned to the client computer 112A.

Returning a Page of Data

In an embodiment, a query indicates that the response should include each event message meeting the criteria specified in the query. This type of query may be useful when a user of client computer 112A, for example, needs to view or inspect the actual event messages as opposed to a sole report against a range of event messages. In this situation, the user of client computer 112A is likely limited to the viewing area of the client computer interface, whether it be the size of a computer monitor or a dimension of a window of a graphical user interface (GUI) of the client computer 112A. Thus, in an embodiment, event processing computer 101 generates a response which includes only a screen-sized page of data.

In an embodiment, the screen size or dimension of a GUI of client computer 112A is an initialization parameter for event processing computer 101. In this configuration the portion of data returned by event processing computer 101 is a fixed at a certain size. However, in other embodiments, the screen size or dimension of a GUI of client computer 112A is sent with the query, enabling event processing computer 101 to return a dynamically apportioned "page" of requested event messages.

In order to produce a single page of data, the steps of FIG. 5 are performed as discussed above, and in step 508, a screen sized portion of data is returned starting at the start of the range identified by the query (T1). FIG. 3 depicts a screen-sized portion 303 of event messages to be returned by event processing computer 101 to a client computer 112A. As client computer 112A continues to request page-after-page of event messages, event processing computer 101 returns each subsequent screen sized portion of event messages until the end of the range specified in the query (Tn).

As an example, if a client computer 112A has a monitor which has a maximum viewing area of 50 syslog messages, a query that produces a thousands, or millions of records is not relevant to the user all at once, as only 50 syslogs can be viewed at any given time. Thus, in an embodiment where the query specifies the screen size of client computer 112A, event processing computer 101 generates a response which includes only 50 syslog messages starting from T1. As the user requests a subsequent page of data, or provides a scrolling input to the client computer 112A, event processing computer 101 returns the next 50 syslog messages.

Implementation Mechanisms

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method comprising:
  receiving a plurality of event messages from internetworking devices, each of the event messages including a sequential identifier identifying a time at which a device generated and sent the event message;
  storing the event messages in a working table in a data storage unit;
  when a number of the event messages exceeds a specified threshold number of messages, determining a particular range of sequential identifiers of the event messages stored in the working table, renaming the working table as a rollover table, and creating a new working table to receive a plurality of subsequent event messages;
  wherein the particular range of sequential identifiers indicates a minimum value and a maximum value determined from the sequential identifiers;
  wherein the minimum value corresponds to a first event message timestamp associated with a first event message stored in the rollover table;
  wherein the maximum value corresponds to a last event message timestamp associated with a last event message stored in the rollover table;
  repeating the preceding receiving, storing, and creating as additional event messages are received and for additional rollover tables each storing the specified threshold number of messages;
  storing a reference, to a particular rollover table, in a management table, a wherein the reference identifies the particular range of sequential identifiers included in the rollover table;
  generating summary data that summarizes at least a subset of the event messages included in the rollover tables according to one or more criteria;
  storing, in a summary table, the summarized data in association with the reference to the rollover tables;
  wherein the method is performed by one or more computing devices.

2. The method of claim 1, wherein the one or more criteria identify information which was requested by a previously received query for at least a subset of the event messages included in the rollover tables.

3. The method of claim 1, wherein the one or more criteria identify information anticipated to be requested in a future query for at least a subset of the event messages included in the rollover tables.

4. The method of claim 1, further comprising:
  receiving, from a client computer, a query which identifies a subset of the event messages in any of the rollover tables and the one or more criteria;
  generating a response to the query based, at least in part, on the reference to the rollover table.

5. The method of claim 4, wherein the response to the query is based at least in part on the summary data according to the one or more criteria.

6. The method of claim 4, wherein the response includes at least a portion of the subset of the event messages identified by the query.

7. The method of claim 6, wherein the portion is a page of data based on a dimension of a window of a graphical user interface of the client computer.

8. The method of claim 1, further comprising:
  receiving, from a client computer over a network, a query identifying a subset of the plurality of event messages;
  in response to receiving the query from the client,
  determining, based on references in the management table, a range of rollover tables that store the subset of the plurality of event messages;
  determining a total count of records relevant to the query, wherein the determination is based, at least in part, on the references stored in the management table, and summary data stored in the summary table.

9. The method of claim 8, further comprising:
  determining a first count of records relevant to the query based on a count of the relevant records in a first rollover table and a last rollover table, the first and last rollover tables corresponding to the first and last rollover tables in the range of rollover tables identified by the query;
  determining a second count of records relevant to the query based on a sum of at least a subset of the summary data in the summary table;
  determining the total count of records relevant to the query based, at least in part, on the first count and the second count;
  sending, to the client computer, a predetermined quantity of the subset of the event messages identified by the query and the total count of records.

10. The method of claim 9, wherein the predetermined quantity is based on a dimension of a window of a graphical user interface of the client computer.

11. A non-transitory computer-readable storage medium storing one or more sequences of instructions which, when executed by one or more processors, cause the one or more processors to perform:

receiving a plurality of event messages from internetworking devices, each of the event messages including a sequential identifier identifying a time at which a device generated and sent the event message;

storing the event messages in a working table in a data storage unit;

when a number of the event messages exceeds a specified threshold number of messages, determining a particular range of sequential identifiers of the event messages stored in the working table, renaming the working table as a rollover table and creating a new working table to receive a plurality of subsequent event messages;

wherein the particular range of sequential identifiers indicates a minimum value and a maximum value determined from the sequential identifiers;

wherein the minimum value corresponds to a first event message timestamp associated with a first event message stored in the rollover table;

wherein the maximum value corresponds to a last event message timestamp associated with a last event message stored in the rollover table;

repeating the preceding receiving, storing, and creating as additional event messages are received and for additional rollover tables each storing the specified threshold number of messages;

storing a reference, to a particular rollover table, in a management table, wherein the reference identifies the particular range of sequential identifiers included in the rollover table;

generating summary data that summarizes at least a subset of the event messages included in the rollover tables according to one or more criteria;

storing, in a summary table, the summarized data in association with the reference to the rollover tables.

12. The non-transitory computer-readable storage medium of claim 11, wherein the one or more criteria identify information which was requested by a previously received query for at least a subset of the event messages included in the rollover tables.

13. The non-transitory computer-readable storage medium of claim 11, wherein the one or more criteria identify information anticipated to be requested in a future query for at least a subset of the event messages included in the rollover tables.

14. The non-transitory computer-readable storage medium as recited in claim 11, further comprising instructions for carrying out the steps of:

receiving, from a client computer, a query which identifies a subset of the event messages in any of the rollover tables and the one or more criteria;

generating a response to the query based, at least in part, on the reference to the rollover table.

15. The non-transitory computer-readable storage medium as recited in claim 14, wherein the response to the query is based at least in part on the summary data according to the one or more criteria.

16. The non-transitory computer-readable storage medium as recited in claim 14, wherein the response includes at least a portion of the subset of the event messages identified by the query.

17. The non-transitory computer-readable storage medium as recited in claim 16, wherein the portion is a page of data based on a dimension of a window of a graphical user interface of the client computer.

18. The non-transitory computer-readable storage medium as recited in claim 11, further comprising instructions for carrying out the steps of:

receiving, from a client computer over a network, a query identifying a subset of the plurality of event messages;

in response to receiving the query from the client, determining, based on references in the management table, a range of rollover tables that store the subset of the plurality of event messages;

determining a total count of records relevant to the query, wherein the determination is based, at least in part, on the references stored in the management table, and summary data stored in the summary table.

19. The non-transitory computer-readable storage medium as recited in claim 18, further comprising instructions for carrying out the steps of:

determining a first count of records relevant to the query based on a count of the relevant records in a first rollover table and a last rollover table, the first and last rollover tables corresponding to the first and last rollover tables in the range of rollover tables identified by the query;

determining a second count of records relevant to the query based on a sum of at least a subset of the summary data in the summary table;

determining the total count of records relevant to the query based, at least in part, on the first count and the second count;

sending, to the client computer, a predetermined quantity of the subset of the event messages identified by the query and the total count of records.

20. The non-transitory computer-readable storage medium as recited in claim 19, wherein the predetermined quantity is based on a dimension of a window of a graphical user interface of the client computer.

* * * * *

UNITED STATES PATENT AND TRADEMARK OFFICE
CERTIFICATE OF CORRECTION

PATENT NO. : 8,738,583 B2
APPLICATION NO. : 13/024218
DATED : May 27, 2014
INVENTOR(S) : Roulei Zhang, Sohag Desai and Hemant Patel Page 1 of 1

It is certified that error appears in the above-identified patent and that said Letters Patent is hereby corrected as shown below:

In the claims:

Claim 1, column 12, line 6: delete "a"

Signed and Sealed this
Ninth Day of September, 2014

Michelle K. Lee
*Deputy Director of the United States Patent and Trademark Office*